US007203652B1

(12) United States Patent
Heck

(10) Patent No.: US 7,203,652 B1
(45) Date of Patent: Apr. 10, 2007

(54) METHOD AND SYSTEM FOR IMPROVING ROBUSTNESS IN A SPEECH SYSTEM

(75) Inventor: Larry Paul Heck, Los Altos, CA (US)

(73) Assignee: Nuance Communications, Burlington, MA (US)

( * ) Notice: Subject to any disclaimer, the term of this patent is extended or adjusted under 35 U.S.C. 154(b) by 550 days.

(21) Appl. No.: 10/081,177

(22) Filed: Feb. 21, 2002

(51) Int. Cl.
*G10L 17/00* (2006.01)
*G10L 15/00* (2006.01)

(52) U.S. Cl. ............... 704/273; 704/231; 704/246; 704/251

(58) Field of Classification Search ............ 704/249, 704/275, 246, 273, 251, 274, 231–233
See application file for complete search history.

(56) References Cited

U.S. PATENT DOCUMENTS

| | | | |
|---|---|---|---|
| 5,127,043 A | 6/1992 | Hunt et al. | |
| 5,297,183 A | 3/1994 | Bareis et al. | |
| 5,297,194 A | 3/1994 | Hunt et al. | |
| 5,365,574 A | 11/1994 | Hunt et al. | |
| 5,774,525 A * | 6/1998 | Kanevsky et al. | 379/88.02 |
| 5,897,616 A | 4/1999 | Kanevsky et al. | |
| 5,913,192 A | 6/1999 | Parthasarathy et al. | |
| 5,913,196 A | 6/1999 | Talmor et al. | |
| 6,081,782 A | 6/2000 | Rabin | |
| 6,161,090 A | 12/2000 | Kanevsky et al. | |
| 6,243,678 B1 * | 6/2001 | Erhart et al. | 704/249 |
| 6,292,782 B1 * | 9/2001 | Weideman | 704/273 |
| 6,356,868 B1 | 3/2002 | Yuschik et al. | |
| 6,456,698 B1 | 9/2002 | Morganstein et al. | |
| 6,477,500 B2 * | 11/2002 | Maes | 704/275 |
| 6,529,871 B1 * | 3/2003 | Kanevsky et al. | 704/246 |
| 6,539,352 B1 * | 3/2003 | Sharma et al. | 704/249 |
| 6,671,669 B1 * | 12/2003 | Garudadri et al. | 704/255 |
| 6,836,758 B2 * | 12/2004 | Bi et al. | 704/231 |

OTHER PUBLICATIONS

Douglas A. Reynolds, Automatic Speaker Recognition Using Gaussian Mixture Speaker Models, vol. 8, No. 2, 1995, The Lincoln Laboratory Journal, pp. 173-192.

D.A. Reynolds and L.P. Heck, "Integration of Speaker and Speech Recognition Systems," Proceedings of IEEE International Conference on Acoustics, Speech and Signal Processing, pp. 869-872, Atlanta, Georgia, May 1991.

Q. Li, B.H. Juang, Q. Zhou and C.H. Lee, "Verbal Information Verification," Proceedings of Eurospeech, pp. 839-842, Murray Hill, New Jersey, 1997.

U.S. Appl. No. 09/523,106, entitled, "Method and System for Speech Identity Verification," filed on Mar. 10, 2000, of Larry P. Heck (abandoned).

* cited by examiner

*Primary Examiner*—Talivaldis Ivars Smits
*Assistant Examiner*—Abdelali Serrou
(74) *Attorney, Agent, or Firm*—Blakely Sokoloff Taylor & Zafman LLP

(57) ABSTRACT

The present invention introduces a system and method for improved robustness in a speech system. In one embodiment, a method comprises receiving an utterance from an intended talker at a speech recognition system; computing a speaker verification score with a voice characteristic model associated and with the utterance; computing a speech recognition score associated with the utterance; and selecting a best hypothesis associated with the utterance and based on both the speaker verification score and the speech recognition score.

25 Claims, 3 Drawing Sheets

METHOD AND SYSTEM FOR IMPROVING ROBUSTNESS IN A SPEECH SYSTEM

FIELD OF THE INVENTION

The present invention relates to the field of speech systems. In particular, the present invention relates to a system and method for improving robustness in a speech system.

BACKGROUND OF THE INVENTION

Speech and speaker recognition systems are currently in use for responding to various forms of commerce via a voice network. One example of such a system is utilized in conjunction with a stock brokerage. According to this system, a caller can provide his account number, obtain a quotation for the price of a particular stock issue, purchase or sell a particular number of shares at market price or a predetermined target price among other types of transactions.

The overall performance of such systems are impacted greatly by the environment in which a speaker speaks to the system. For example, speech recognition may be adversely affected in situations when the speaker is speaking in a noisy environment. The noise may include the speech of other people, music, road noise, or any other type of stationary or non-stationary noise. The results of noise may cause the system to misinterpret the commands given by the speaker. In financial industries, the impact of misinterpretations by prior art systems may be disastrous.

SUMMARY OF THE INVENTION

The present invention introduces a system and method for robust speech recognition by employing a user specific response mechanism in a speech network. In one embodiment, the method comprises receiving an utterance from an intended talker at a speech recognition system. A speaker verification score is computed with a voice characteristic model associated and with the utterance and a speech recognition score associated with the utterance is computed. A best hypothesis associated with the utterance and based on both the speaker verification score and the speech recognition score is selected.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A system and method is disclosed for improved robustness in a speech system. In one embodiment, the method comprises receiving an utterance from an intended talker at a speech recognition system. A speaker verification score is computed with a voice characteristic model associated and with the utterance and a speech recognition score associated with the utterance is computed. A best hypothesis associated with the utterance and based on both the speaker verification score and the speech recognition score is selected.

The present invention also relates to systems for performing the operations, herein. The techniques described herein may be implemented using a general-purpose computer selectively activated or configured by a computer program stored in the computer or elsewhere. Such a computer program may be stored in a computer readable storage medium, such as, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently constrained to any particular type of computer or other system. Various general-purpose systems may be used with programs in accordance with the teachings herein, or it may prove convenient to construct more specialized system to perform the required method steps. The required structure for a variety of these systems will be apparent from the description below. In addition, any of a variety of programming languages, including C++ and Java, may be used to implement the teachings of the techniques described herein.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive except where so stated or as readily apparent to those skilled in the art.

Figure 1:
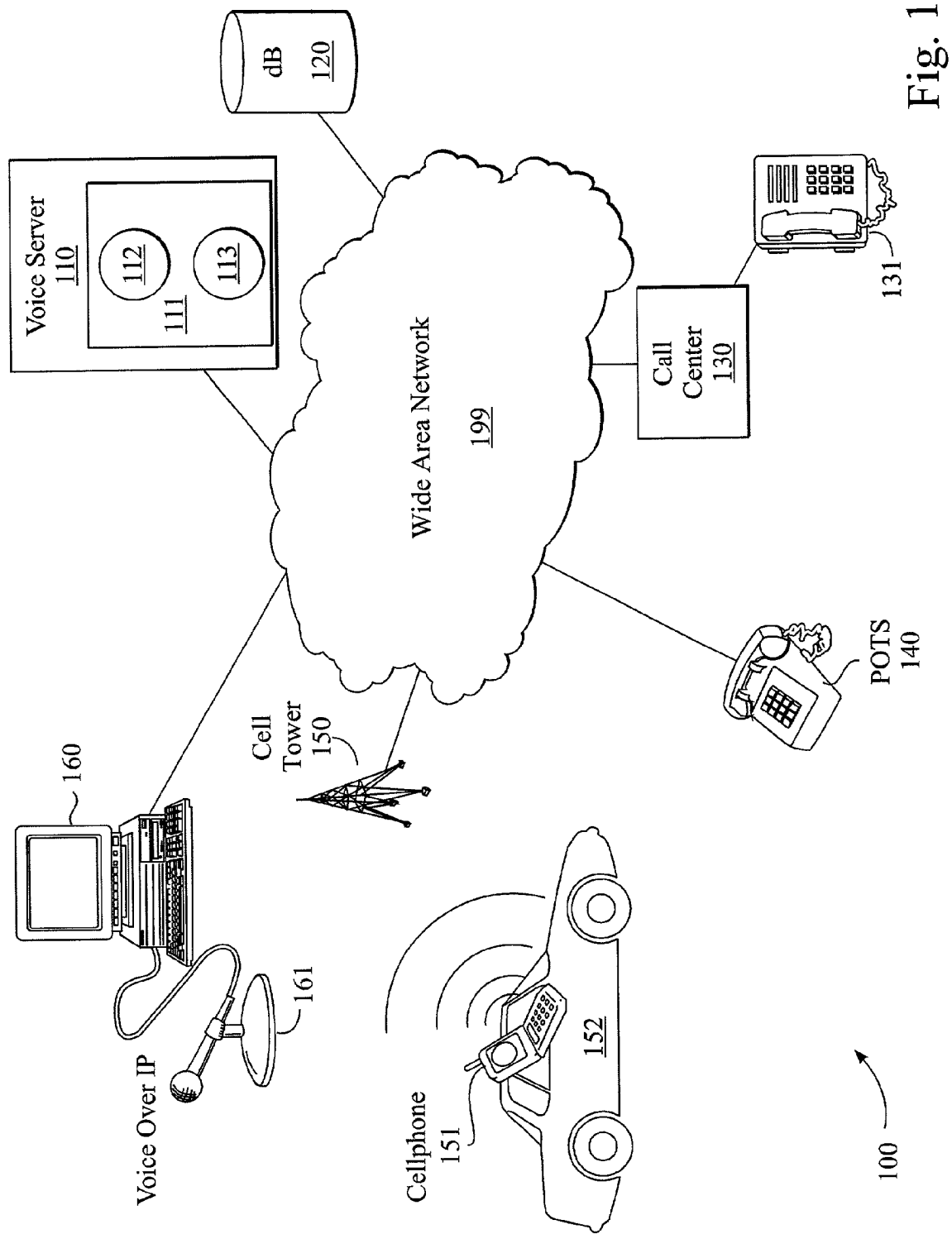
FIG. 1 illustrates a speech network according to one embodiment of the present invention.

FIG. 1 illustrates a speech network according to one embodiment of the present invention. Network 100 may support numerous voice related applications. For example, network 100 may be used to automatically provide a user news, weather, movie times stock quotes, and similar non-secure information. However, network 100 may also be used to automatically provide a user secure information, such as banking information, stock trading information, and similar information that is user specific. Secure information requests are user—specific, in that network 100 should only provide the information if a specified user makes the request. Both secure and non-secure information requests may be generated in network 100. Speech network 100 supports numerous devices for capturing and delivering voice. A user may call into network 100, via a digital telephone 131, used mainly in offices through a call center 130. Traditional, plain old telephone system (POTS) or analog telephones 140 may be used. Cellular telephones 151, via a cellular tower 150 may also be used. Similarly, requests to network 100 may be made through a voice over Internet Protocol (VoIP) microphone 161 via a workstation 160.

These speech-capturing devices 131–161 may be interconnected through a wide area network 199, such as the Internet. Voice server 110 receives the information requests and returns a response to the requester via WAN 199. Voice server 110 provides improved robustness and includes an integrated speaker recognition system and speech recognition system 111 (hereafter "Device 111"). Device 111 includes an automatic speaker recognizer 113 and an automatic speech recognizer 112. Speaker recognizer 113 may also have an integrated speaker detector. The present method and system utilizes the speaker recognizer 113 to improve speech recognizer 112's performance.

Device 111 is a speaker recognition system that may be a speaker dependent speech recognizer, voice authentication device, and/or speaker identifier. Database 120 is accessible via WAN 199 and stores personal profiles and configuration information, for example, bank account name, address and balance information.

Situations arise where network 100 must support user specific response and recognition in which improved robustness is beneficial. For example, a user may be driving in automobile 152, and he attempts to place an order to sell 100 shares of company ABC stock. However, just as the user is about to utter, "Sell 100 ABC," his son from the back seat screams, "Sell 100 XYZ." The present method and system for improved robustness in speech network 100 may continue to track the intended speaker and recognize that it was not the desired speaker who spoke, and reject the son's utterance, instead of placing a false order.

Another voice application where the network 100 supports user specific response and recognition occurs when two users are speaking at the same time. Known prior art systems perform recognition only on the first user, however, if the first user's speech pauses, the prior art system catches on to the second user and recognizes the speech of the second user, believing the second user is still the first user.

Thus, the present method and system may be used to improve speech recognition performance, or specifically robustness in cases of interfering speakers by using information about the user's voice. Furthermore, the present method and system may be used to improve speech recognition in noisy environments that do not only include interfering talkers. For example, elements of network 100 could be used in conjunction with a hands-free microphone kit for a cellular telephone, inside an automobile. In addition to multiple speakers, there may be noise from the highway and engine. The present method and system may also be used in noisy cafes, subways, trains, and crowds where improved robustness is desired.

In one embodiment, a voice application arises where a single unidirectional microphone is placed near the desired speaker, although systems having multiple or omni-directional microphones may also be used to add the element of space to the system. The single microphone embodiment adds additional challenges due to the fact that all noises, including the desired speaker are mixed at the microphone. Thus, the separation techniques for isolating the desired speech from the other noise, must be done electronically using energy and timing information instead of space or range information.

Figure 2:
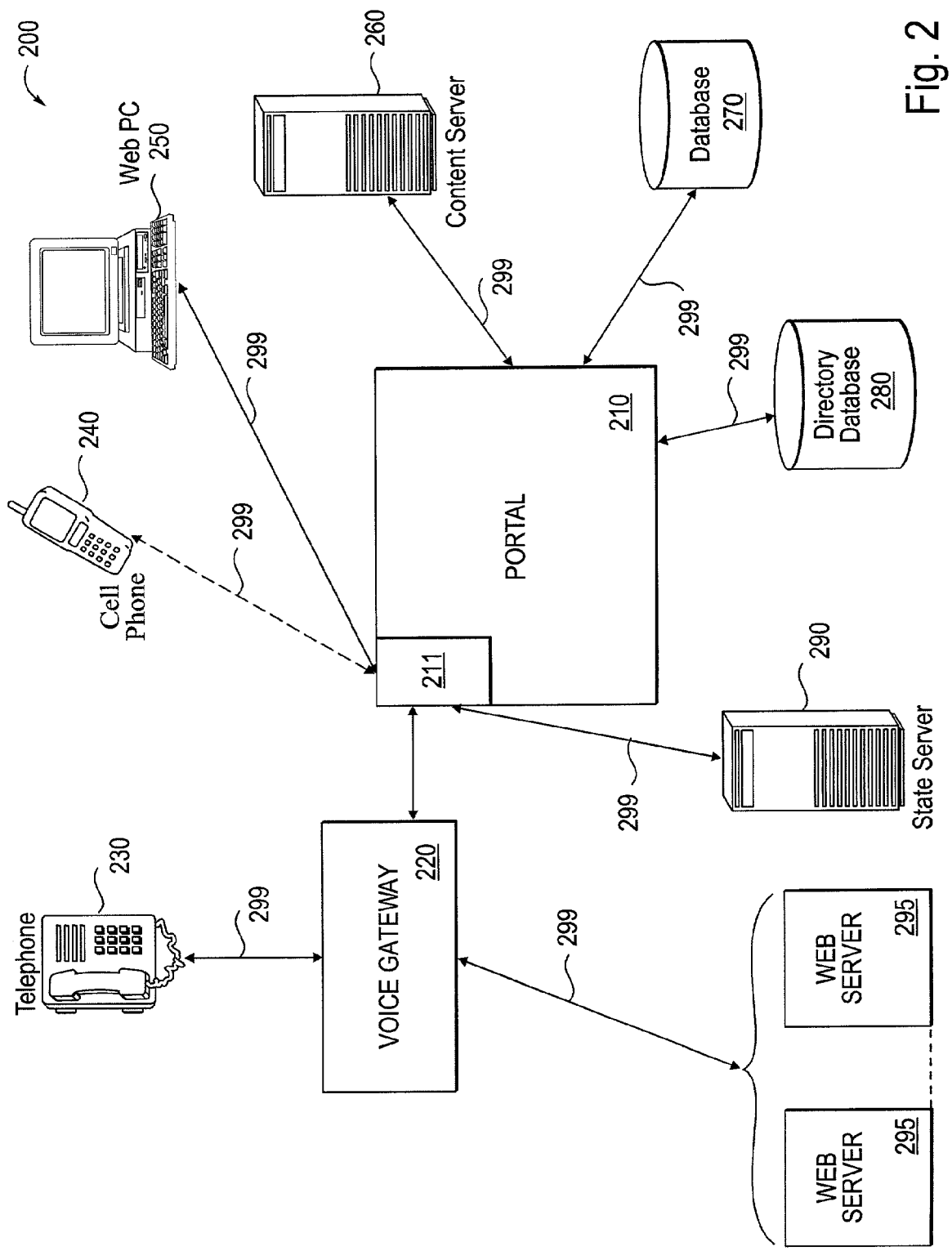
FIG. 2 illustrates a computer system representing an integrated multi-processor, in which elements of the present invention may be implemented.

FIG. 2 illustrates a computer system representing an integrated multi-processor, in which elements of the present invention may be implemented. Computer system 200 may represent the hardware architecture of voice server 110 that includes device 111.

Computer system 200 may also represent workstations 160, or call center 130. In one embodiment of the present invention, computer system 200 may be an IBM® compatible personal computer (PC), an Apple Macintosh® personal computer, or a SUN® SPARC workstation. The operating system run on computer system 200 may be Windows®, LINUX, SUN® Solarise® or other similar operating system.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 may also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network. The communication device 240 may comprise a modem, a network interface card, or other well-known interface device, such as those used for coupling to Ethernet, token ring, or other types of networks.

Figure 3:
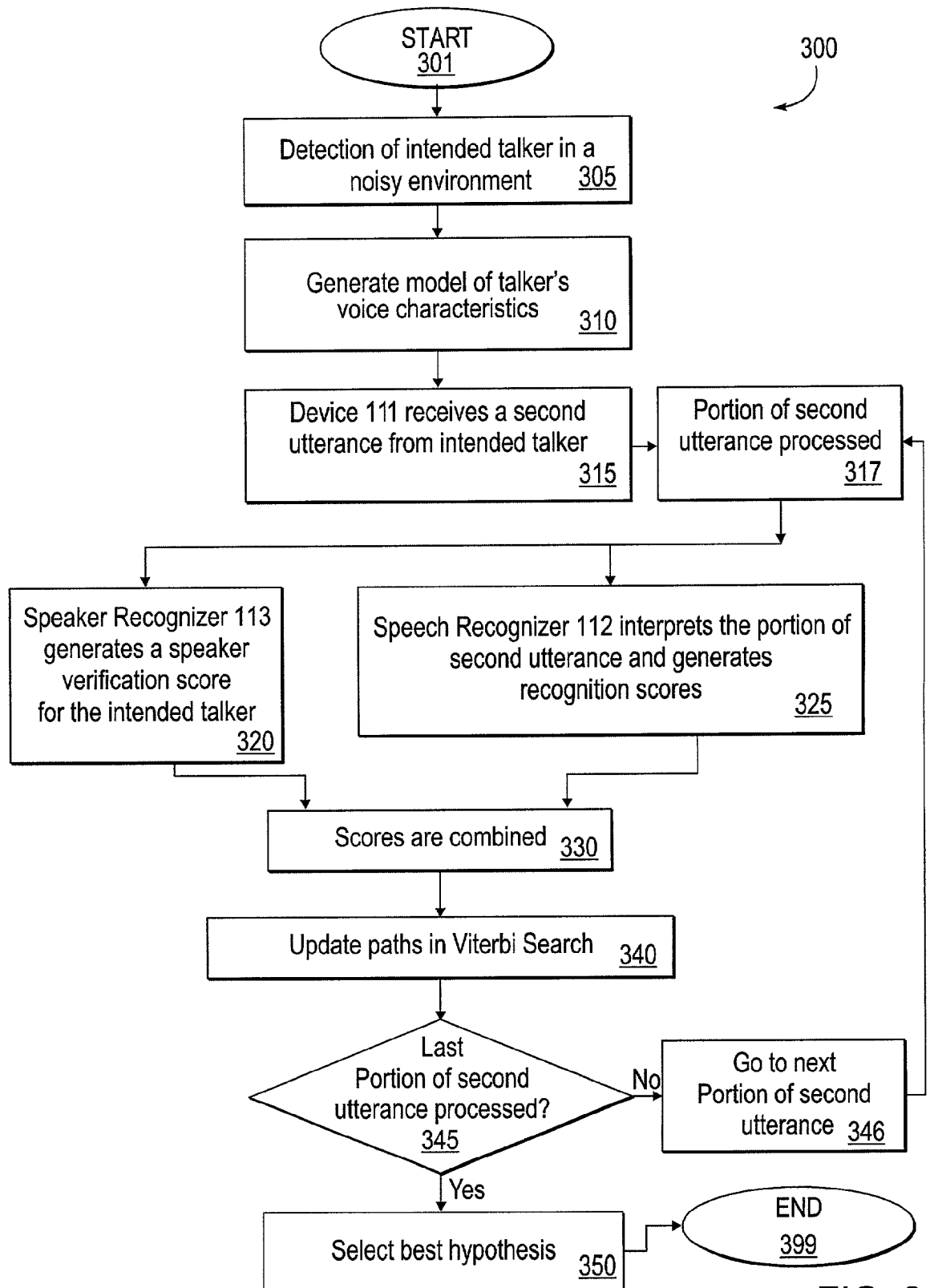
FIG. 3 illustrates an exemplary flow diagram of the process performed by an integrated speech and speaker recognizer to provide improved robustness.

FIG. 3 illustrates an exemplary flow diagram of the process 300 performed by device 111 to provide improved robustness. The process begins at block 301. At processing block 305, device 111 detects the desired or intended talker using speaker recognizer 113. The environment surrounding the intended talker may be noisy, or silent. The intended talker may be registered with network 100—that is a voice characteristic model may already be stored in database 120 for the intended talker. In another embodiment, the intended talker has no pre-existing voice model stored on network 100. The detection may occur by having the intended talker provide device 111 an identity claim to authenticate and verify. In another embodiment, device 111 may select a dominant voice as the intended talker in a noisy environment by measuring the energy levels associated with the speech received by device 111. In yet another embodiment, the detection may occur by using hotword speech recognition. For example, device 111 may detect the intended talker, when the intended talker says the hotword "computer."

Flow continues to processing block 310, where an initial model of the intended talker's voice characteristics is created. The model may be a voice print, or any data that provides a personal profile such as acoustic and/or linguistic characteristics unique to the intended talker.

At processing block 315, device 111 receives a second additional utterance or utterances from the intended talker who is in the noisy environment. The noisy environment includes other speakers talking in the background, music, highway road sounds and any other stationary or non-stationary noise. The first and second utterances may be two portions of the same sentence or of the same word. Flow continues to processing block 317 where a portion of the second utterance is processed by device 111. This portion of the second utterance may be the entire utterance received in block 315, or it may be a word spoken in the utterance, a phonetic syllable ("phoneme") of the word, or a single frame. In the case of processing an individual frame, the frame may be a few milliseconds, for example in one embodiment of the invention, the frame may be 30 milliseconds of speech.

Processing flow continues to processing blocks 320 and 325. At processing block 320, the speaker recognizer 113 generates a speaker verification score for the intended talker. While the speaker recognizer 113 generates the speaker verification score, speech recognizer 112 interprets the portion of the second utterance, and generates a speech recognition score. The speech recognition score is indicative of speech recognizer 112's confidence in determining that the portion of the second utterance was correctly processed.

Flow continues to processing block 330, where the speaker verification and speech recognition scores are combined. The scores may be combined in numerous ways, with different weightings. In one embodiment, the phoneme- and state-dependent speech recognition scores for a specific frame of data are scaled by a weight between 0 and 1, depending on the verification score for that frame. Specifically, if the verification score is very high (i.e., there is a very good match between the data and the voiceprint), then the recognition score for the particular phoneme/state is weighted by a scalar close to 1 (unaltered), whereas if the verification score is very low (i.e., the data does not match the voiceprint), then the recognition score is scaled by a very small weight close to zero. In this way, if the processed data originated from a sound source other than the intended talker, then the verification score will be low and the speech recognition system's highest-scoring string of phonemes/words (search path) up to that point in the search will not be substantially altered by the data.

At processing block 340 speech recognition search paths are updated in speech recognizer 112 based on the combined score to generate a list of best hypothesis of what the intended talker is saying. The score may be altered based on a forward Viterbi search (left-to-right, i.e. time=0 until the time when the utterance is complete), such that alterations are made at the sentence, word, phonetic or frame level. In alternate embodiments, the search may be forward, backward or multipass.

Flow continues to decision block 345 where device 111 determines if the last portion of speech in the utterance has been processed. If the last portion of speech has not been processed, then flow continues to processing block 346 where the next portion of speech is called and flow is passed back to processing block 317. If the last portion of speech has been processed, then flow continues to block 350. At processing block 350, the best hypothesis is selected and used by the network 100 to generate a response. The process ends at block 399.

On a frame level, speech recognizer 112 (in block 325) performs a computation that determines the likelihood that the frame of speech comes from a particular phoneme. For example, recognizer 112 may compute the likelihood that a 30 millisecond frame of speech came from the phoneme "ah." In addition to performing the computation with the data of the given frame, the likelihood computation also takes into account previous likelihood computations and information about the next frame that will be processed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving a first utterance from a speaker at an integrated speech and speaker recognition system;
   generating a voice characteristic model for the speaker;
   receiving a second utterance from the speaker at the speaker recognition system;
   processing a portion of speech associated with the second utterance, wherein processing comprises,
      computing a speaker verification score based on the voice characteristic model associated with the portion of speech,
      computing a speech recognition score associated with the portion of speech, and
      generating a combined score by combining the speaker verification score and the speech recognition score; and
   selecting a best hypothesis from a plurality of hypotheses representing automatic speech recognition results of the second utterance,
      based upon the combined score.

2. The method of claim 1, wherein the portion of speech includes a word, a sentence, a syllable, or a frame.

3. The method of claim 1, wherein said processing further comprises altering a search path in a Viterbi search used by a speech recognizer.

4. The method of claim 1, further comprising using hotword speech recognition to identify the speaker.

5. The method of claim 1, wherein the voice characteristic model includes a voice print, a personal profile and linguistic characteristics.

6. A system comprising:
   a speech system; and
   a speech input device connected to the speech system;
   wherein the speech system comprises,
      a voice server, wherein the server includes an integrated speech and speaker recognizer that,
         receives a first utterance from a speaker via the speech input device;
         creates a voice characteristic model for the speaker;
         receives a second utterance from the speaker via the speech input device;
         processes a portion of speech associated with the second utterance, wherein the processor
      computes a speaker verification score based on the voice characteristic model associated with the portion of speech,
      computes a speech recognition score associated with the portion of speech, and
      generates a combined score by combining the speaker verification score and the speech recognition score; and
   selects a best hypothesis from a plurality of hypotheses representing automatic speech recognition results of the second utterance, based upon the combined score.

7. The system of claim 6, wherein the speech input device comprises a cellular telephone, an analog telephone, a digital telephone, and a voice over internet protocol device.

8. The system of claim 6, wherein the portion of speech includes a word, a sentence, a syllable, or a frame.

9. The system of claim 6, wherein the server is further configured to alter a search path in a Viterbi search used by a speech recognizer.

10. An integrated speech and speaker recognition system comprising:
- means for receiving a first utterance from a speaker;
- means for generating a voice characteristic model for the speaker;
- means for receiving a second utterance from the speaker at the speaker recognition system;
- means for processing a portion of speech associated with the second utterance, wherein said means for processing comprises,
  - means for computing a speaker verification score based on the voice characteristic model associated with the portion of speech,
  - means for computing a speech recognition score associated with the portion of speech, and
  - means for generating a combined score by combining the speaker verification score and the speech recognition score; and
- means for selecting a best hypothesis from a plurality of hypotheses representing automatic speech recognition results of the second utterance, based upon the combined score.

11. The system of claim 10, wherein the portion of speech includes a word, a sentence, a syllable, or a frame.

12. The system of claim 10, wherein the means for processing further comprises means for altering a search path in a Viterbi search used by a speech recognizer on the second utterance.

13. The system of claim 10, further comprising means for using hotword speech recognition to identify the speaker.

14. The system of claim 10, wherein the voice characteristic model includes a voice print, a personal profile and linguistic characteristics.

15. A machine-readable medium having stored thereon a plurality of instructions which, when executed by a machine, cause said machine to perform a process comprising:
- receiving a first utterance from a speaker at an integrated speech and speaker recognition system;
- generating a voice characteristic model for the speaker;
- receiving a second utterance from the speaker at the speaker recognition system;
- processing a portion of speech associated with the second utterance, wherein processing comprises,
  - computing a speaker verification score based on the voice characteristic model associated with the portion of speech,
  - computing a speech recognition score associated with the portion of speech, and
  - generating a combined score by combining the speaker verification score and the speech recognition score; and
- selecting a best hypothesis from a plurality of hypotheses representing automatic speech recognition results of the second utterance, based upon the combined score.

16. The machine-readable medium of claim 15 wherein the portion of speech includes a word, a sentence, a syllable, or a frame.

17. The machine-readable medium of claim 15, having stored thereon additional instructions when processing a portion of speech, said additional instructions when executed by a machine, cause said machine to perform altering a search path in a Viterbi search used by a speech recognizer.

18. The machine-readable medium of claim 15, having stored thereon additional instructions which, when executed by the machine while identifying a speaker, cause said machine to use hotword speech recognition to identify the speaker.

19. The machine-readable medium of claim 15, wherein the voice characteristic model includes a voice print, a personal profile and linguistic characteristics.

20. A method comprising:
- receiving an utterance from a speaker at a speech recognition system;
- computing a speaker verification score based on a voice characteristic model associated and with the utterance;
- computing a speech recognition score associated with the utterance; and
- selecting a best hypothesis from a plurality of hypotheses representing automatic speech recognition results of the utterance, based on both the speaker verification score and the speech recognition score.

21. The method of claim 20, wherein the voice characteristic model is obtained from a voice model database.

22. The method of claim 20, wherein the voice characteristic model is obtained from a first portion of the utterance.

23. A speech recognition system comprising:
- a speaker verifier;
- a speech recognizer connected to the speaker verifier; and
- an input device connected to the speaker verifier and speech recognizer, wherein the input device receives an utterance from a speaker; and
wherein the speech recognizer generates a recognition score associated with the utterance and generates a plurality of hypotheses representing automatic speech recognition results of the utterance, the speaker verifier generates a speaker verification score associated with the utterance; and the recognition score is combined with the verification score to select a best hypothesis of the plurality of hypotheses.

24. The speech recognition system of claim 23, wherein the speech recognizer and speaker verifier are software entities residing on a speech server, and wherein the speech server comprises a processor, a bus connected to the processor, and memory connected to the bus that stores the software entities.

25. The speech recognition system of claim 24, further comprising a database connected to the speech server, wherein the database stores a voice characteristic model of the speaker.

* * * * *